US008024593B2

(12) United States Patent
Ito et al.

(10) Patent No.: US 8,024,593 B2
(45) Date of Patent: Sep. 20, 2011

(54) COMMUNICATION DEVICE (75) Inventors: Satoshi Ito, Nara (JP); Takeshi Kokado, Kyoto (JP); Noriyuki Hidaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 1016 days.

(21) Appl. No.: 10/583,739

(22) PCT Filed: Oct. 7, 2005

(86) PCT No.: PCT/JP2005/018650
§ 371 (c)(1),
(2), (4) Date: Jun. 20, 2006

(87) PCT Pub. No.: WO2006/043436
PCT Pub. Date: Apr. 27, 2006

(65) Prior Publication Data
US 2009/0177896 A1 Jul. 9, 2009

(30) Foreign Application Priority Data
Oct. 22, 2004 (JP) .................................. 2004-307915

(51) Int. Cl.
*G06F 1/00* (2006.01)
(52) U.S. Cl. .......................... 713/324; 713/300; 713/310
(58) Field of Classification Search .................. 713/310, 713/324, 300
See application file for complete search history.

(56) References Cited

U.S. PATENT DOCUMENTS

| | | | | |
|---|---|---|---|---|
| 5,742,833 A | * | 4/1998 | Dea et al. | 713/323 |
| 6,944,457 B2 | * | 9/2005 | Alinikula et al. | 455/450 |
| 7,107,442 B2 | * | 9/2006 | Cheshire | 713/1 |
| 7,424,632 B2 | * | 9/2008 | Powers et al. | 713/323 |
| 7,545,762 B1 | * | 6/2009 | McConnell et al. | 370/310.2 |
| 7,574,525 B2 | * | 8/2009 | Kilian | 709/238 |
| 2005/0044430 A1 | * | 2/2005 | Cheshire | 713/300 |
| 2005/0149642 A1 | * | 7/2005 | Choi et al. | 710/15 |
| 2005/0165910 A1 | * | 7/2005 | Kilian | 709/219 |

FOREIGN PATENT DOCUMENTS

| | | |
|---|---|---|
| JP | 07-162438 | 6/1995 |
| JP | 9-97241 | 4/1997 |
| JP | 2000-13543 | 1/2000 |
| JP | 2001-257688 | 9/2001 |
| JP | 2003-244157 | 8/2003 |
| JP | 2005-045301 | 2/2005 |
| JP | 2006-25291 | 1/2006 |

* cited by examiner

*Primary Examiner* — Thomas Lee
*Assistant Examiner* — Jaweed A Abbaszadeh
(74) *Attorney, Agent, or Firm* — Wenderoth Lind & Ponack, L.L.P.

(57) ABSTRACT

A communication device searches for a desired communication device and requests a service, without being conscious of the status of the power supply of other communication devices on a network, and achieves a reduction in power consumption. The communication device includes a main processing unit to process main service provided for other communication devices, a network processing unit to transmit and receive a request packet and a response packet among other communication devices, and an integrated power supply unit to stop supplying power to the main processing unit in a state of being able to supply it again and to supply the power to the network processing unit. The network processing unit is provided with an automatic responding unit to determine whether or not it can respond to the received request packet only by itself and, when the response is possible, to transmit the response packet to the communication device, and a power supply controlling unit, when the response is not possible, to control a main-power supply unit to supply the power to the main processing unit.

13 Claims, 7 Drawing Sheets

COMMUNICATION DEVICE

BACKGROUND OF THE INVENTION

Technical Field

The present invention relates to a communication device that is connected to a home network, which is a network in a home, to provide services to each other. Particularly, the present invention relates to a communication device that achieves a reduction in power consumption due to a reduction in standby power, and an automatic discovery and an automatic cooperation of communication devices present in the network.

Background Art

In recent years, as the information-oriented society has been developed, networking at home has been quickly spreading. Since a communication device connected to the network at home is used not by an engineer but by a general home user, setup operation of the communication device must be as easy as possible.

Additionally, by the communication devices connected through the network cooperating with each other, in other words, by the communication device operating while controlling the other communication devices, enhancement of the convenience of services provided by the communication devices is anticipated.

In general, when controlling other communication devices present on the network, it requires acquiring IP address information of a communication device to be controlled and setting for it, as well as acquiring information, including the type of the communication device to be controlled and the service provided by the communication device and setting for it. As a method for acquiring the IP address or the service information of the communication device to be controlled, a service discovery protocol such as UPnP (Universal Plug and Play) is known. In order to automatically discover the communication device to be controlled and to acquire the IP address or the service information using such a service discovery protocol, however, there is a problem that a power supply of the communication device to be controlled must be turned on.

Namely, in order to keep the communication device connected to the network in a state where it can automatically be discovered, the power supply of the communication device must be normally turned on.

However, in recent years, with the rise of the consciousness to energy saving, a reduction in standby power of each communication device has been desired, so that a usage mode where the power supply is always turned on has been regarded as problematic.

In response to this problem, there is known a power supply controlling method which provides two energization states in the communication device, wherein (1) when a main-power supply is in an off-state, a sub-power supply energizes only a network device which performs the processing regarding the network, and (2) when a power supply starting packet is received from the network, the main-power supply of the communication device is turned to an on-state to service all the communication devices (for example, see Patent Reference 1).

While, for example, each communication device transmits a discovery packet in order to search for the communication device to be controlled, this method makes it possible, by transmitting the power supply starting packet before transmitting the discovery packet, to search for the communication device even when the main-power supply of the communication device is in an off-state.

Meanwhile, in another parallel computer system, in order to enable a controlling device to manage the status of the respective operational units and to control the power supply thereof, there is known a method wherein an auxiliary device connected to each operational unit is energized by the sub-power supply when each operational unit is in an off-state, and wherein the auxiliary device processes a response to a status inquiry from the controlling device and a correspondence to a request of controlling the power supply (for example, see Patent Reference 2).

In this method, when the auxiliary device receives the power supply starting packet from the controlling device, the power supply of the operational unit is turned to an on-state, so that the operational unit is turned to a fully operable state.

By performing such control, the parallel computer system makes it possible to achieve a reduction in power consumption and a reduction in rush power upon turning on the power.
[Patent Reference 1: Japanese Unexamined Patent Publication No. 2003-244157
[Patent Reference 2: Japanese Unexamined Patent Publication No 1997-97241

However, the conventional power supply controlling method described in Patent Reference 1 simply enables, when a new communication device is connected to the network (namely, when the communication device with which the power supply is already turned on has acquired a list of the communication devices to be controlled connected to the network), the power supplies of all the communication devices connected to the network to be turned on for acquiring communication device information. Hence, there is a problem that, with the protocol such as UPnP (Universal Plug and Play) where the inquiry of the communication device to be controlled is transmitted irregularly by multicast over the network, it can not expect the power-saving effect.

Additionally, in the protocol such as UPnP, each communication device is required to notify that the communication device itself is in a state of being able to provide the service by transmitting an alive packet by multicast for every certain period. Since the periodical transmission of the alive packet can not be solved by the conventional power supply controlling method, it is necessary that the power supply is always turned on in order to transmit the alive packet.

Moreover, in the prior art described in Patent Reference 2, as a trigger to restore the operational unit from a power-saving operation state to a normal state, there is transmitted a request packet (power supply starting packet) which is for the controlling unit on the controlling side to restore a specific operational unit to be controlled to the normal state. As a result, in order to transmit the request packet to properly restore the specific operational unit to be controlled to the normal state, there is a problem that the controlling device on the controlling side must realize whether the operational unit to be controlled is in the power-saving operation state or in the normal state.

In view of the foregoing problems, it is an object of the present invention to provide a communication device which enables to discover a desired communication device using the service discovery protocol such as UPnP while the main-power supply of the communication device to be controlled on the network is in an off-state, without the communication device on the controlling side being conscious of the status of the communication device to be controlled.

In addition to that, it is a second object of the present invention to provide a communication device which enables to control the discovered communication device to be controlled, without the communication device on the controlling side being conscious of the status of the communication device to be controlled.

SUMMARY OF THE INVENTION

In order to solve the foregoing problems and to maintain the communication device to be controlled always controllable without the communication device to control managing the status of the communication device to be controlled, a special function such that the communication device to be controlled itself determines ON/OFF control of the main-power supply thereof is required. The function in which the communication device to be controlled itself determines ON/OFF control of the main-power supply thereof has not been achieved yet, so a problem that the communication device to control must manage the status of the communication device to be controlled has not been solved.

In order to solve the aforementioned problems, the communication device of the present invention is the communication device for communicating via a network to provide the service for other communication devices on the network, including: main processing means operable to process main service provided for other communication devices; communication processing means operable to transmit and receive request information and response information corresponding thereto among other communication devices via the network; and power supply means operable to stop supplying power to the main processing means in a state of being able to supply it again and to supply the power to the communication processing means. The communication processing means is provided with: a response possibility determining section which determines whether or not the communication processing means is individually able to respond to the request information received from other communication devices; a response section, when the determination indicates that the response is possible, which creates the response information and transmit to the other communication devices; and a power supply controlling section, when the determination indicates that the response is not possible, which starts the main processing means, controls the power supply means, and supplies the power to the main processing means.

In this case, when the response is possible only by the communication processing means, it can respond to other communication devices without turning on the main-power supply of the communication device. Meanwhile, when the response is not possible only by the communication processing means, namely, when it is required to process the main service provided for other communication devices, it can start the main processing means to supply the power so that the main processing means performs the processing.

Moreover, the response section may pass over the received request information to the main processing means when the determination indicates that the response is not possible, and the main processing means may perform the processing of responding to the request information that has been passed over.

As a result of this, in the communication device, the communication processing means receives the request information and the response is not possible only by the communication processing means, it can cause the main processing means to perform the processing of responding to the request information that has been passed over.

Moreover, the response possibility determining section may determine that the response is possible when the received request information is: (1) a discovery request, which is an inquiry of presence of the communication device from other communication devices; (2) an acquisition request of description information, indicating either of a type, a name, an ID, or the service to provide of the communication device; or (3) both of them.

As a result of this, the communication device can automatically respond to both of the discovery request and the acquisition request of the description information.

Moreover, the response possibility determining section may determine that the response is not possible when the received request information is: (1) a control request which requires control for other communication devices to receive the service provided by the communication device; or (2) a status inquiry request which inquires a status of service of the communication device.

In this case, since the main-power supply is started only when the communication device receives a control request packet which requires control for receiving the service to be provided from other communication devices, or receives a status inquiry of service, a reduction in power consumption of the communication device can be achieved.

Moreover, the communication processing means may be provided with an alive packet transmitting section which is connected to the network for every predetermined time to indicate that the communication device is in a state where the communication device can provide the service, and transmits an alive packet including at least address information of the communication device.

As a result of this, only by the processing using the communication processing means, it can notify other communication devices connected to the network that the communication device is present and the communication device is in a state where the communication device can provide the service.

Moreover, the power supply controlling section may control the power supply means to stop supplying the power to the main processing means when the request information determined not to be possible to respond is not received for a predetermined period.

In this case, by turning off the main-power supply when the control request packet or a status acquisition packet is not received any more, a significant reduction in power consumption of the communication device can be achieved.

Moreover, when the main processing mean completes the processing of responding to the request information that has been passed over, the main processing means controls the power supply means to stop the power supply to the main processing means.

As a result of this, the power supply is automatically turned off by the main processing means after a series of processing is completed, so that a reduction in power consumption of the communication device can be achieved.

Moreover, the communication processing means may be further provided with address management means operable to store information indicating an address of the communication device and a term of validity of the address, and, when a period until expiration of the term of validity turns into predetermined time, start the main processing means via the power supply controlling section to supply the power to the main processing means, and cause the main processing means to execute an update processing of the address.

As a result of this, the main processing means can be started only upon processing the update of the address, so that a reduction in power consumption can be achieved. Additionally, since the term of validity of the address in the communication device is provided and the address is updated only at the time of predetermined time, a significant reduction in power consumption can be achieved.

Moreover, the power supply means may be configured as one power supply means including a main-power supply section which supplies the power to the main processing means and a communication power supply section which supplies the power to the communication processing means, and wherein the power supply control means may control the power supply to the main processing means in accordance with a direction from the communication processing means or the main processing means.

As a result of this, since the loss of the power can be reduced by one power supply means to energize the main processing means and the communication processing means, a significant reduction in power consumption of the communication device can be achieved.

According to the present invention, the communication device can be discovered without turning on the power supply of the communication device on the network upon such as connecting a new communication device and without the controlling communication device being conscious of the status of the communication device to be controlled. By the power supply of the communication device being automatically turned on upon controlling the communication device by determination of the communication device to be controlled itself, a reduction in power consumption can be achieved without causing any loss to the convenience of cooperation of the communication devices through communication.

Numerical References

| | |
|---|---|
| 100 through 400: | communication devices |
| 500: | network |
| 110: | main processing unit |
| 111: | main CPU |
| 112: | I/O |
| 113, 123: | RAM |
| 114, 124: | ROM |
| 120: | network processing unit |
| 121: | network controller |
| 122: | network I/F |
| 130: | main-power supply section |
| 140: | sub-power supply section |
| 701: | communication I/F section |
| 702: | address storage section |
| 703: | automatic responding section |
| 704: | power supply controlling section |
| 705: | alive packet transmitting section |

DETAILED DESCRIPTION OF THE INVENTION

Embodiments of the present invention will be described based on the drawings.

Figure 1:
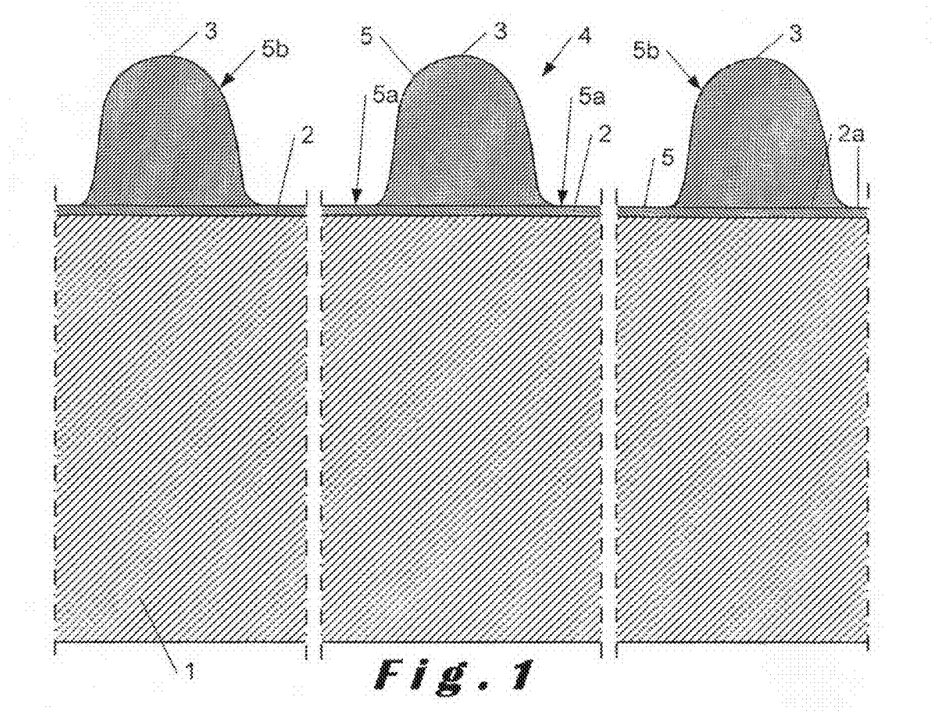
FIG. 1 is a diagram illustrating a configuration of a home network which connects communication devices in accordance with present embodiment.

FIG. 1 is a block diagram illustrating a network configuration of a communication device in the embodiment. A communication device 100 and a plurality of communication devices 200 through 400 are connected via a network 500. A configuration of the network 500 may be wired or wireless. The respective communication devices 100 through 400 can communicate with each other through the network, and provide service of themselves for a user or other communication devices. As an example of the service which the communication device provides, the communication device is an AV recorder corresponding to the network to transmit contents list information in response to a request from other communication devices, or to transmit contents requested from other communication devices. Note herein that the AV recorder described here is an example of the communication device, and the communication device may be a device which can be discovered and searched for by other communication devices on the network using a service discovery protocol to provide the service for the user or other communication devices.

Figure 2A:
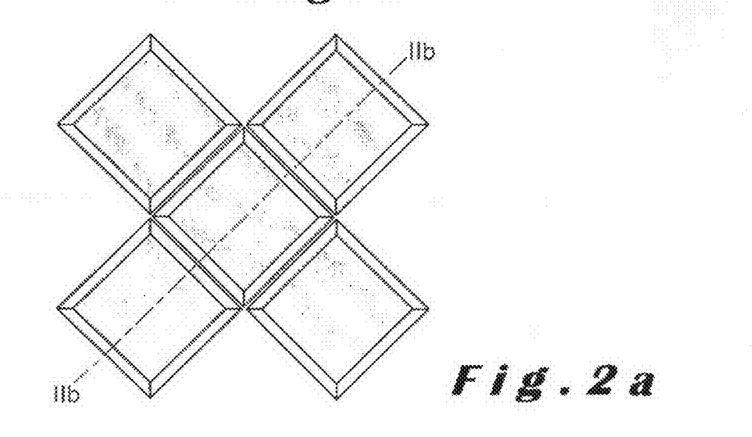
FIG. 2 is a block diagram illustrating an example of a hardware configuration of the communication device in the present embodiment.
Figure 2B:
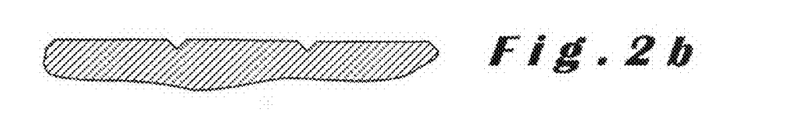

Meanwhile, FIG. 2 illustrates an example of a fundamental hardware configuration of the communication device 100. In FIG. 2, the communication device 100 is provided with a main processing unit 110, a network processing unit 120, a main-power supply section 130, and a sub-power supply section 140. The main processing unit 110 is a processing unit which performs the processing of the service provided for the user or other communication devices. In the aforementioned example of the AV recorder, the service including provision of the contents list information and transmission of contents data is performed by the main processing unit 110. In order to perform such processing, the main processing unit 110 is provided with a main CPU 111 which performs the processing of data or a program related to the service, a ROM 114 and a RAM 113 which store the data or the program processed by the CPU, and an I/O 112 with an HDD (Hard Disk Drive) storing the contents data connected thereto.

The main-power supply section 130 is a functional section to supply power to the main processing unit 110, and is controllable in ON/OFF of the power supply by controlling a network controller 121, which will be henceforth described, and the main CPU 111.

The network processing unit 120 is a processing unit to transmit and receive information via the network. In the aforementioned example of the AV recorder, reception processing of a request packet from other communication devices, notification to the main processing unit 110, and transmission processing to other communication devices of the data requested from the main processing unit 110 are relevant. In addition to that, the network processing unit 120 of this embodiment has characteristic functions such as an automatic ON/OFF control function of the main-power supply section 130, a function to analyze a packet received from other communication devices and to create and automatically transmit response information when a preliminarily assumed request is received, and an alive packet transmitting function to periodically send the alive packet for notifying that the unit itself is connected to the network and is operable.

The network processing unit 120 is configured by the network controller 121 to perform the processing of the data or the program for providing the aforementioned functions, a ROM 124 and a RAM 123 which store the data or the program processed by the network controller 121, and a network I/F 122 to enable input/output to the network.

The sub-power supply section 140 is a functional section which is able to supply the power constantly to the network processing unit 120 even when the main-power supply section 130 is in an off-state.

Figure 3:
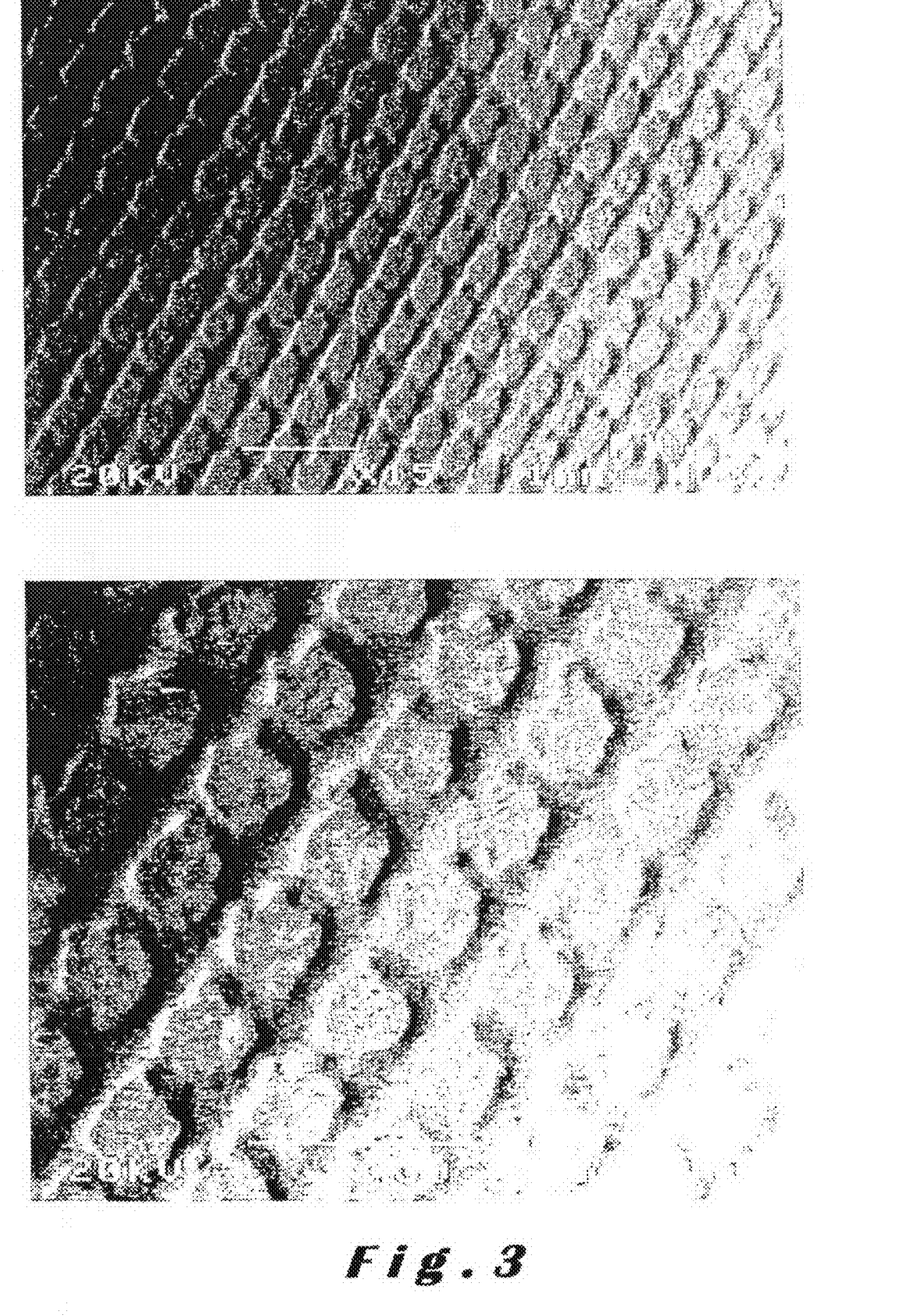
FIG. 3 is a block diagram illustrating an example of a functional configuration of a network processing unit shown in FIG. 2.

Next, a configuration of a function provided by the network processing unit 120 will be described using FIG. 3. FIG. 3 illustrates a functional configuration of the network processing unit 120.

In FIG. 3, the network processing unit 120 is provided with a communication I/F section 701, an address storage section 702, an automatic responding section 703, a power supply controlling section 704, and an alive packet transmitting section 705.

The communication I/F section 701 performs transmission and reception of the information to the network using address information managed by the address storage section 702.

The address storage section 702 provides a function for managing the address information of the communication device 100 itself with the information on a term of validity of the address, and, when the term of validity turns into predetermined time, controlling the main-power supply section 130 through the power supply controlling section 704, which will be henceforth described, to supply the power to the main processing unit 110 and start the main processing unit 110, and causing the main processing unit 110 to execute an update processing of the address.

The automatic responding section 703 creates and transmits a response to: (1) a discovery request, which is an inquiry of presence from other communication devices; (2) an acquisition request of description information, including a type, a name, an ID, the service to provide of the communication device; or (3) both of them.

The power supply controlling section 704, upon reception of (1) a control request packet related to the control of the service provided by the communication device 100, as for a response thereto the automatic responding section 703 can not transmit, or (2) a status inquiry request packet to inquire a service status, provides a function to control the main-power supply section 130 to turn on the power supply to start the main processing unit 110, and to pass over the received request packet to the main processing unit 110, not by being controlled by an external controlling communication device but by determination of the communication device 100 itself. The power supply controlling section 704 also provides a function to control the main-power supply section 130 in accordance with a direction by the address storage section 702, as well as a function to turn off the power supply from the main-power supply section 130 when the request packet notified to the main processing unit 110 is not received for a predetermined period.

In order to notify other communication devices that the communication device 100 itself is connected to the network and is operable, the alive packet transmitting section 705 transmits the alive packet including at least the address information of the communication device 100 itself for every predetermined period, e.g., for every fifteen-minute interval.

Figure 4:
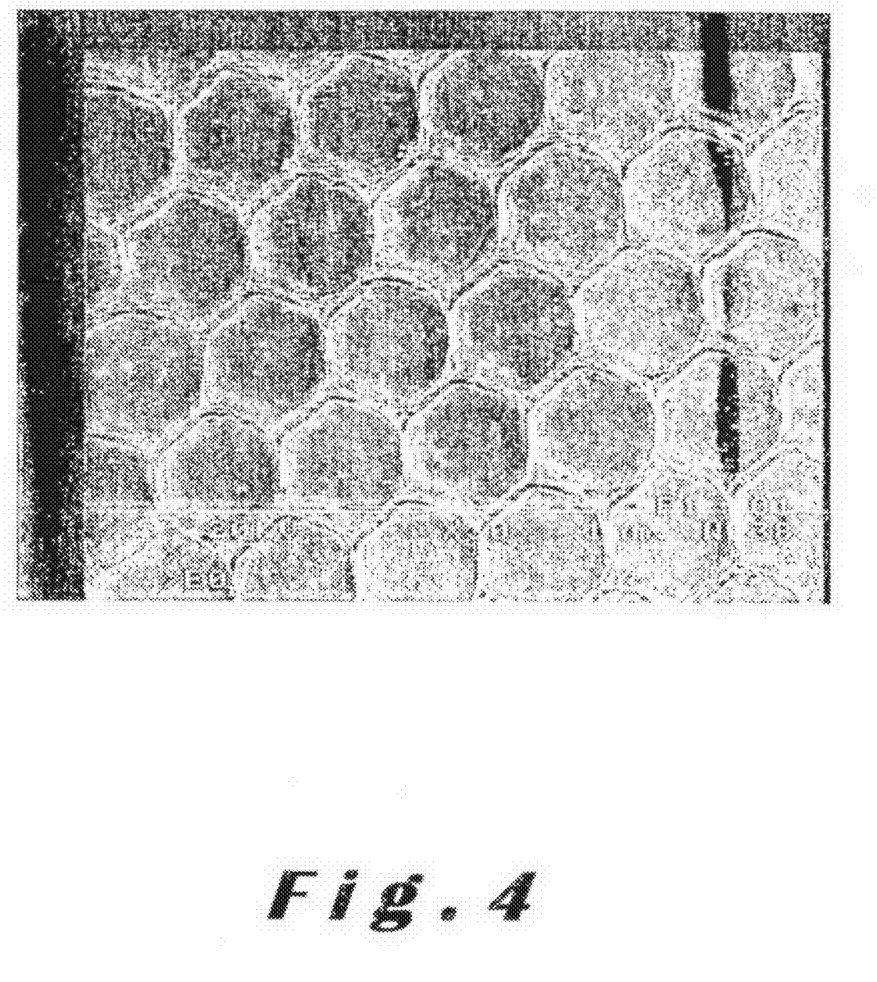
FIG. 4 is a flowchart illustrating a procedure when the communication device shown in FIG. 2 receives and processes a request packet.
Figure 5:
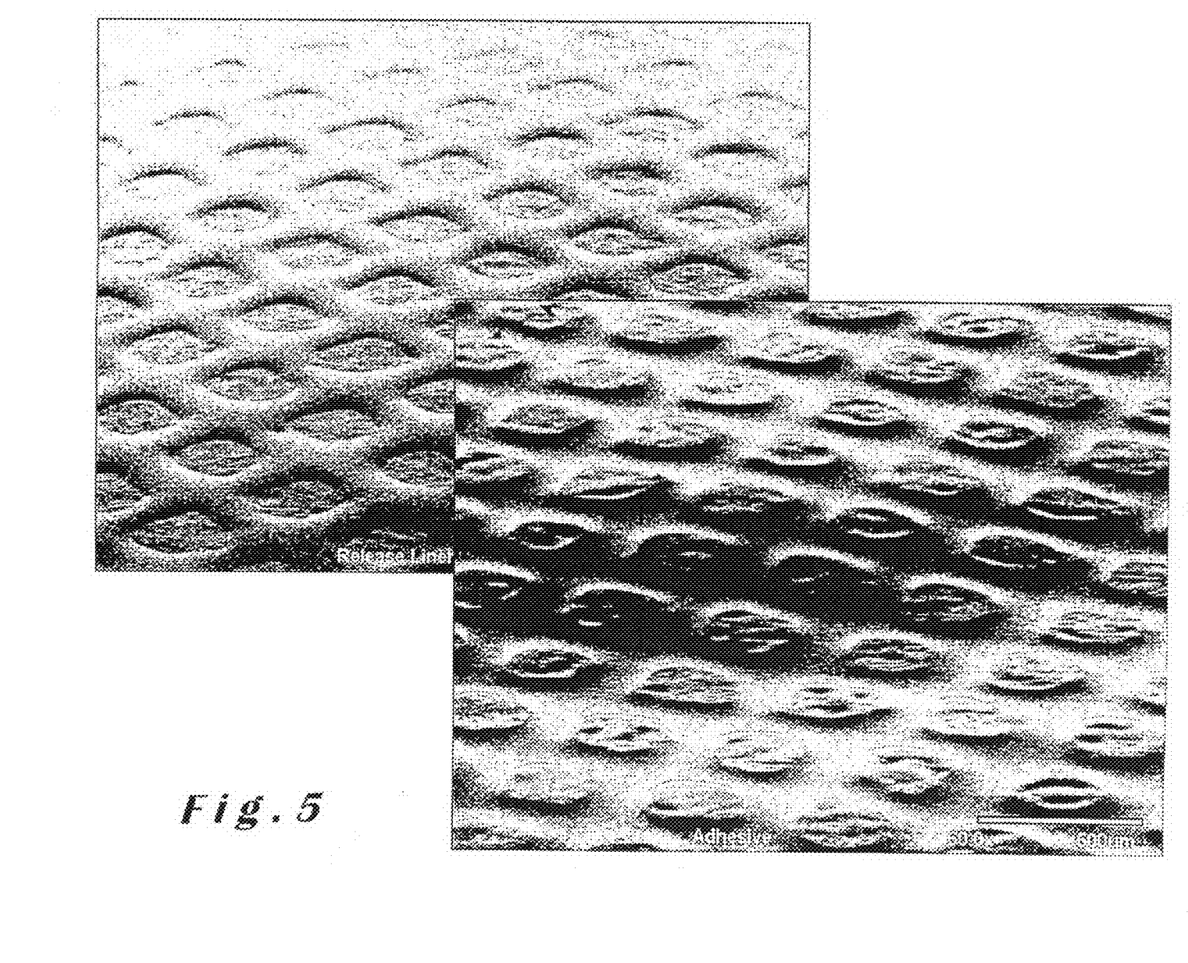
FIG. 5 is a diagram illustrating an example of the request packet and a response packet which are transmitted and received among the communication devices of the present embodiment.

Regarding the communication device having the network processing unit 120 configured as described above, an operation thereof will be hereinafter described using FIGS. 3 through 5. FIG. 4 is a flowchart illustrating a procedure when the communication device 100 shown in FIG. 2 receives the request packet and determines whether or not to start the main processing unit 110. FIG. 5 is a diagram illustrating an example of the request packet and a response packet which are transmitted and received among the communication devices of this embodiment.

First, the communication device 100 monitors the network to which it is connected (S300). Next, when the packet is transmitted to the communication device 100, the packet is received (S301). Upon reception of the packet, the received packet is analyzed, and then the following processing is performed when the receive packet is either of the control request packet and a status acquisition request packet (S302). It is confirmed whether or not the main processing unit 110 has started, and when not having started, it is determined that the processing by the network processing unit 110 can not be performed, not by being controlled by the external controlling communication device but by determination of the communication device 100 itself, resulting in the main-power supply unit 130 being turned on to start the main processing unit 110 (S303).

Consequently, the processing corresponding to the received packet is performed by the main processing unit 110 (S304).

When the main processing unit is in a dormant state from the start, the main-power supply section of the communication device is then turned off after a series of processing is completed (S305).

Meanwhile, at Step S302, when the request packet other than the control request packet or the status acquisition request packet is received, the response is automatically created and transmitted by the network processing unit 120 (S306). Note herein that, while this embodiment is described using UPnP as an example, protocols other than UPnP may be applicable to be used. It is possible to use other protocols, such as SLP (Service Location Protocol) or Rendezvous.

While the procedure described above using FIG. 4 is the fundamental operation of the communication device 100 according to the present invention, the more detailed operation will be hereinafter described using a specific example of the packet. First, the communication devices 200-400 and the communication device 100 connected to the network transmit the discovery request in order to search for the communication device other than themselves connected to the network. As illustrated in the left-middle column of a table in FIG. 5, the discovery request packet includes information on a search target described at ST, and a multicast address "239.255.255.250" along with a port number "1900" described at HOST, and is multicasted. Upon reception of the discovery request packet, the communication device corresponding to the search creates a discovery response packet. The discovery response packet includes the search target to which itself correspond is described at ST, and own UUID (Universally Unique Identifier) is described at USN. The discovery response packet is transmitted to the communication device which is a transmission source of the corresponding discovery request packet. As a result of this, the communication device is connected to the network and the communication device which provides the desired service can be searched for.

Moreover, when the communication device 100 is newly connected to the network, in order to announce the information indicating that it is connected to other communication devices 200-400 by itself, it transmits the alive packet by multicast to the network. For example, when using UPnP as the protocol, as illustrated in the top left column of the table in FIG. 5, the alive packet includes such as acquisition URL information of detailed information (description information) related to the communication device, constituted by the IP address information of itself, the information on the UUID of itself, the type of the communication device, and the type of service to provide, or identification information of the communication device, described at LOCATION, and information on such as the term of validity of this notice described at CACHE-CONTROL.

For that reason, the communication device which received the alive packet can, without performing the search using the aforementioned discovery request packet, obtain the acquisition URL of the IP address, the communication device type, and the type of service to provide of the communication device 100 which transmitted the packet, as well as the detailed information related to the communication device. With this alive packet, the respective communication devices 200-400 can discover the communication device 100 not only when the discovery request packet is transmitted by themselves but also immediately after the communication device 100 is newly connected to the network.

Additionally, since the alive packet has the term of validity, it is possible to detect that the communication device 100 is removed from the network by detecting that the alive packet is not transmitted from the communication device 100 until the term of validity passes.

The communication device 100 which has discovered the communication device of the intended target to control performs the control of the communication device by acquiring the detailed information (description information) of the communication device of the target to control, transmitting the request (control request) packet to control the service provided by the communication device or the status inquiry request packet to inquire the status of service, and receiving the response thereto.

Next, "processing at the time of reception of the discovery request packet", "processing of alive packet transmission", "processing of IP address acquisition and update", and "processing of the control request packet and the status acquisition request packet", which are performed by the communication device, will be hereinafter described in detail.

Processing at the time of reception of the discovery request packet It will be described of the discovery processing performed by the respective communication devices to discover the communication device of the intended target to control on the network as shown in FIG. 1. In this embodiment, a sequence is described as an example where the communication device 100 discovers the communication device 300 on the network using UPnP. Meanwhile, in this case, it is described assuming that the power supply from the main-power supply sections of the respective communication devices 200-400 is in an off-state.

The communication device 100 transmits the discovery request by multicast. At this time, the type or the service to provide of the communication device of intended target to control is specified with ST (search target) element of the discovery request.

The communication I/F section 701 of the network control unit of the respective communication devices which has received the discovery request (M-Search request) from the communication device 100 passes over the received discovery request packet to the automatic responding section 703.

The automatic responding section 703 recognizes that the received packet is the discovery packet, and then confirms the information on the search target of the discovery request packet. When the information (=search) specified with the search target does not match with the information for automatic response managed by the automatic responding section 703, namely, when it does not correspond to the device currently searched for, the request packet is discarded and no response is returned.

When there is the information which matches with the search target, namely, when the device itself corresponds to the device currently searched for, the discovery response packet is created to the discovery request packet corresponding to the search target and transmitted to the communication device 100.

Similarly, the communication I/F section 701 of the network control unit which has received the acquisition request (HTTP GET request) of the description information describing the detailed information of the communication device also passes over the received discovery request packet to the automatic responding section 703. The automatic responding section 703 then creates the response packet and sends it to the communication device 300.

As described above, the discovery request packet and the description information acquisition request packet can be responded, even when the power supply from the main-power supply section is in an off-state, only by the network processing unit to which the power is supplied from the sub-power supply. As a result, even when the power supply from the main-power supply section of the respective communication devices is in an off-state, the communication device 100 can search for the target communication device 300 connected to the network 500, and can process the discovery or the like from other communication devices while significantly reducing the power consumption of the communication device.

Additionally, since it is not necessary to supply the power to the main processing unit in the communication device of this embodiment at the time of reception of the discovery request packet or the description information acquisition request packet, it is also possible to reduce the power consumption in an environment where the discovery processing occurs repeatedly and irregularly due to such as the multicast.

Alive packet transmission processing Meanwhile, in the respective communication devices, when the sub-power supply section is in an on-state and the main-power supply section of the communication device is in an off-state, the alive packet, indicating that the communication device is present on the network and is in a state where the communication device can provide the service, is also transmitted periodically by the alive packet transmitting section 705 of the network processing unit. Here, when using UPnP, the alive packet is sent by multicast of UDP, and the alive packet describes the information such as the IP address information, the information on the type of the communication device, the information on the type of service to provide, the identification information of the communication device, the acquisition URL information of the detailed information regarding the communication device (description information), or the term of validity of the notice.

In order to transmit the alive packet, the alive packet transmitting section 705 stores the information required to create the message, including the identification information of the communication device and the service information provided by the main processing unit.

By sending the alive packet, other communication devices can discover the communication device not only when the discovery request is transmitted by themselves but also immediately after the communication device is newly connected to the network.

As described above, in the alive packet processing, even when the power supply from the main-power supply section is in an off-state, the transmission is periodically performed only by the network processing unit to which the power is supplied from the sub-power supply. In other words, even when the power supply from the main-power supply section of the respective communication devices is in an off-state, the communication device 100 can detect the target communication device 300 connected to the network 500 immediately by the alive packet transmitted from the communication device 300 as a trigger.

As a result, the power consumption of the communication device can be reduced significantly without causing any loss to the convenience of cooperation of the communication devices through communication.

IP address acquisition and update processing Next, the IP address acquisition and update processing will be described. For the communication device to communicate, the IP address is required. There are two major methods for the communication device to acquire the IP address.

One of them is a method of setting up a static IP address. This is the method which sets up the static IP address to the communication device by the user or uses the IP address preliminarily embedded in the communication device.

Another method is a setting method of a dynamic IP address, including such as a method using a DHCP (Dynamic Host Configuration Protocol). In the method using the DHCP, the communication device receives the address with a time limit distributed from a DHCP server and sets it up as the own address. As described above, since the address distributed from the DHCP server has the time limit, if it continues using the address, it is necessary to perform the update processing or the reacquisition processing to the server before the time limit expires.

Additionally, when using UPnP, AUTO IP may be used as dynamic IP address assignment. The AUTO IP is a method used when the DHCP server is not found, and is the method that the respective communication devices by themselves assign and set up an unused address in the present network. When updating the IP address by this method, the address storage section 702 can assign and set up the address independently. When the DHCP server is found after setting up the address by the AUTO IP, however, the address setting must be changed so that the address assigned from the DHCP server is used.

Performing such IP address acquisition and update processing is led by the address storage section 702 of the network processing unit. Specifically, when the static IP address is not set up and the communication device is newly connected to the network 500, for example, the address storage section 702 does not have the effective IP address.

The address storage section 702 which has detected that the effective IP address is not set up transmits an acquisition request event of the IP address to the main processing unit. At this time, if the power supply from the main-power supply section is in an off-state and the main processing unit has not started, the address storage section 702 requests the power supply controlling section 704 to turn on the power supply from the main-power supply section, not by control of the controlling communication device but by determination of the communication device itself, to transmit the address acquisition request event to the main processing unit after the main processing unit has started.

The main processing unit which has received the address acquisition request event performs the address acquisition processing by the DHCP, and causes the address storage section 702 to store the acquired address after a series of sequence has been completed. At this time, the term of validity of the IP address specified by the DHCP server is also stored in the address storage section 702.

If the address can not acquired for the reason such as that there is no DHCP server, the main processing unit determines the IP address by itself in accordance with the AUTO IP procedure and causes the address storage section 702 to store it. At this time, the information which indicates that the address is assigned by the AUTO IP is also stored.

When the address is set in the address storage section 702 by the main processing unit, the address storage section 702, in the case that it has requested the power supply controlling section 704 to turn on the power supply from the main-power supply section for the address acquisition, requests the power supply controlling section 704 to turn off the power supply from the main-power supply section not by control of the controlling communication device but by determination of the communication device itself.

Next, the address update processing performed by the address storage section 702 will be described. The address storage section 702 holds the information on the term of validity of the address and transmits an address update request event to the main processing unit 110 when the term of validity turns to predetermined time. At this time, if the power supply from the main-power supply section 130 is in an off-state and the main processing unit 110 has not started, the address storage section 702 requests the power supply controlling section 704 to turn on the power supply from the main-power supply section 130 not by control of the controlling communication device but by determination of the communication device itself, and transmits the address update request event to the main processing unit 110 after the main processing unit 110 has started.

The main processing unit 110 which has received the address update request event performs the address update processing by the DHCP, and causes the address storage section 702 to store the updated address after a series of sequence has been completed. At this time, the term of validity of the new IP address specified by the DHCP server is also stored in the address storage section 702.

Meanwhile, when the address is set up by the AUTO IP, the address storage section 702 periodically monitors whether or not the DHCP server is present.

When the DHCP server is discovered, the address storage section 702 transmits an address acquisition event to the main processing unit 110. At this time, if the power supply from the main-power supply section 130 is in an off-state and the main processing unit has not started, the address storage section 702 requests the power supply controlling section 704 to turn on the power supply from the main-power supply section 130, not by control of the controlling communication device but by determination of the communication device itself, to transmit the address acquisition request event to the main processing unit 110 after the main processing unit 110 has started. The processing of the main processing unit 110 which has received the address acquisition request event is similar to that described above.

When the address is updated and set in the address storage section 702 by the main processing unit 110, the address storage section 702, in the case that it has requested the power supply controlling section 704 to turn on the power supply from the main-power supply section 130 for the address acquisition, requests the power supply controlling section 704 to turn off the power supply from the main-power supply section 130 not by control of the controlling communication device but by determination of the communication device itself.

Note herein that, while the address update processing is performed by the main processing unit 110 in the example described above, it is apparent that the similar effect can be obtained if the address acquisition and update processing is performed only by the address storage section 702.

Moreover, although the main processing unit 110 turns off the power supply from the main-power supply section 130 by determination of the address storage section 702 after the address has been set and updated in the address storage section 702 in the example described above, it is apparent that the similar effect can be obtained if the main processing unit 110 turns off the power supply from the main-power supply section 130 when a series of address acquisition and update sequence has been completed, or if the power supply controlling section 704 detects that there is no event transmitted to the main processing unit 110 for a certain period of time and then turns off the power supply from the main-power supply section 130.

As described above, the IP address acquisition and update processing is performed by the network processing unit 120 with the power supplied from the sub-power supply 140 even when the power supply from the main-power supply section 130 is in an off-state, and the main processing unit 110 is started by not control of the controlling communication device but by determination of the communication device itself if needed. As a result, since the IP address acquisition and update processing, which is required for the communication device to communicate, is constantly possible without increasing the power consumption of the communication device, the power consumption of the communication device can be reduced significantly without resultantly causing any loss to the convenience of cooperation of the communication devices through communication.

Processing of the control request packet and the status acquisition request packet Next, the processing at the time of receiving the control request packet related to control of the service provided by the communication device or the status inquiry request packet to inquire the status of service will be described. The execution of the service provided by the communication device provides to other communication devices or the user is performed by the main processing unit 110. Here, the service provided by the communication device 100 refers to, in the example of the aforementioned AV recorder, the control request including the transmission request of the contents list information or the transmission request of the contents data. Note herein that, the status acquisition request is a request for inquiring the status of the communication device, such as a request for inquiring that the communication device is currently transmitting the contents data, or that the communication device is operable.

Since the execution of the service provided by the communication device is performed by the main processing unit 110, the processing related to the control request packet and the status acquisition request packet can not be performed unless the power is supplied from the main-power supply section 130 and the main processing unit 110 has started. Hence, when the control request packet and the status acquisition request packet are received, the processing is performed as follows.

When the communication I/F section 701 of the network processing unit 120 has received the control request packet and the status acquisition request packet, the packet is passed over to the automatic responding section 703.

The automatic responding section 703 determines, by analyzing a POST portion and a SOAPACTION header of the received packet, whether or not the received packet is the control request packet or the status acquisition request packet. When the received packet is the control request packet or the status acquisition request packet, the automatic responding section 703 determines that it can not automatically response to the packet by itself and passes over packet data to the main processing unit 110 through the power supply controlling section 130. At this time, if the power supply from the main-power supply section 130 is in an off-state and the main processing unit 110 has not started, the automatic responding section 703 requests the power supply controlling section 704 to turn on the power supply from the main-power supply section 130, not by control of the controlling communication device but by determination of the communication device itself, to transmit the control request packet and the status acquisition request packet to the main processing unit 110 after the main processing section unit 110 has started.

The main processing unit 110 which has received the control request packet and the status acquisition request packet performs the processing specified by the request, and transmits the response to a request source.

When the automatic responding section 703 has requested the power supply controlling section 704 to turn on the power supply from the main-power supply section 130 not by control of the controlling communication device but by determination of the communication device itself in order to process the control request packet and the status acquisition request packet, the automatic responding section 703, if there is no request packet notified of the main processing unit 110 for a certain period of time and the main processing unit 110 is not performing any processing, requests the power supply controlling section 704 to turn off the power supply from the main-power supply section 130 not by control of the controlling communication device but by determination of the communication device itself.

Moreover, although the power supply from the main-power supply section 130 is turned off by determination of the automatic responding section 703 in the example described above, it is apparent that the similar effect can be obtained if the main processing unit 110 turns off the power supply from the main-power supply section 130 when a series of processing sequence related to the control request packet and the status acquisition request packet has been completed, or if the power supply controlling section 704 detects that there is no event transmitted to the main processing unit 110 for a certain period of time and then turns off the power supply from the main-power supply section 130.

Note herein that, as for the status acquisition request packet received while the power supply from the main-power supply section 130 is in an off-state, a preset content may be provided as a response by the automatic responding section 703.

Additionally, when the status acquisition is processed using UPnP, it is necessary to transmit status information to the request source whenever the status of the communication device changes. When the main processing unit 110 has started, it is sufficient to provide the notice of the status information whenever the status changes. Meanwhile, when the main processing unit 110 has not started, it is assumed that the change of status does not occur, so that the necessity for a status notification does not arise. However, if, by receiving the control request packet, the main processing unit 110 is temporarily started by not control of the control communication device but determination of the communication device itself and the processing in response to the control request is performed, the change of status may occur, so that the status notification may be processed if needed by the time the main processing unit 110 is turned off again.

Figure 6:
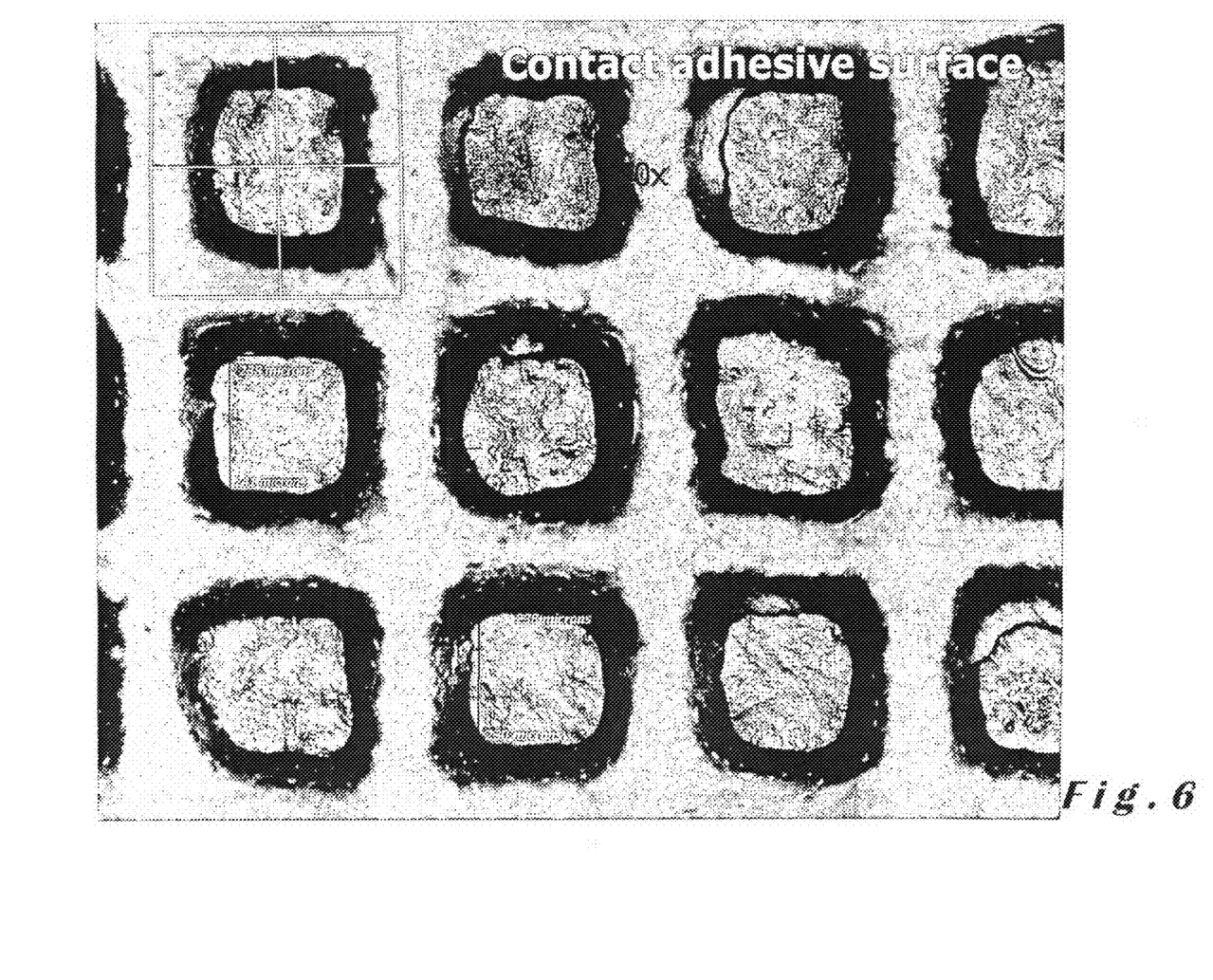
FIG. 6 is a diagram illustrating a specific example of the request packet and the response packet shown in FIG. 5.
Figure 7:
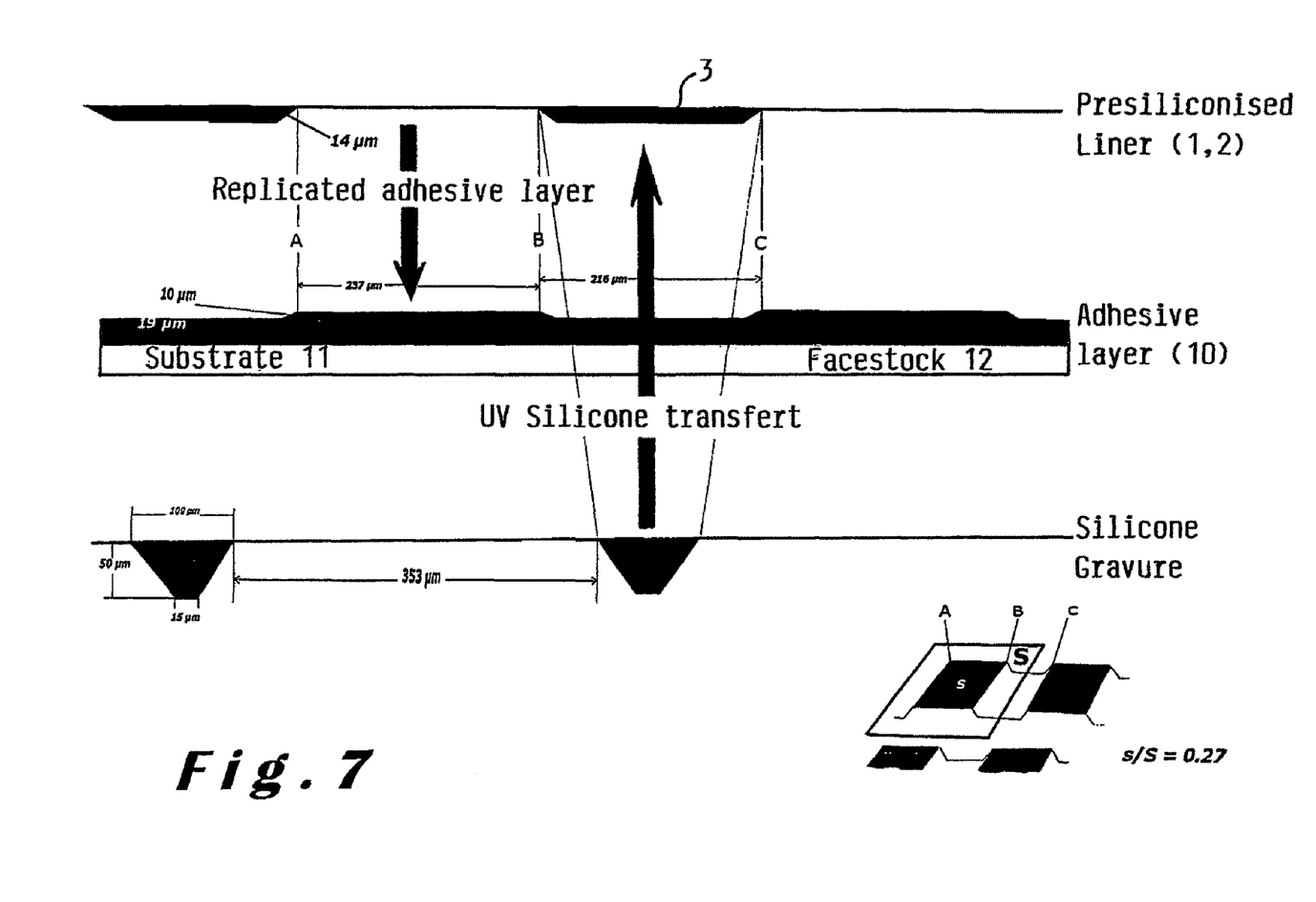
FIG. 7 is a diagram illustrating a specific example of a status acquisition request packet and a status acquisition response packet.

FIG. 6 is a diagram illustrating a specific example of the request packet and the response packet shown in FIG. 5. FIG. 7 is a diagram illustrating a specific example of the status acquisition request packet and the status acquisition response packet. Hereinbelow, configurations of the sequence and the packet will be described in consideration of the following network configuration and conditions.

First, assume that the condition where a device A and a device B are connected to the network. In addition, under the condition where the following addresses are assigned to the respective devices, the device B discovers and controls the device A.

Device A: 192.168.0.1 (CD player providing the service PlayCD) Devices B: 192.168.0.3 (e.g., a remote control or a PC to control) The device A (CD player), when connected to the network, periodically transmits the alive packet as shown in the top left column in FIG. 6.

The left-middle column in FIG. 6 illustrates an example of the discovery request packet. The aforementioned device B (remote control) searches for the device A (CD player) connected to the same network. When searching for the device A, the discovery request packet as shown in FIG. 6 is used as the packet to be transmitted.

Here, by specifying the service to be searched for in an ST header field such as upnp:rootdevice, various UPnP devices on the network can be discovered.

In this regard, since the search target here is the service of the device A (CD player) and it is sufficient that PlayCD is discovered, other services are not mentioned. Incidentally, when the device B (remote control) has received the alive packet from the device A (CD player) and realizes presence of the device A, the discovery request packet may not be necessarily transmitted.

The right-middle column in FIG. 6 illustrates an example of the discovery response packet. The device A (CD player) which has received M-SEARCH as the discovery request packet creates the discovery response packet corresponding to the device B which has transmitted M-SEARCH. The network processing unit automatically responds then. In addition, it is determined whether the automatic response is possible in accordance with the following conditions. In other words, it is determined whether POST and SOAPACTION of the header of the packet as a packet type of the control request packet are within the header. After this determination has been performed for the control request packet, the main processing unit is started when it is in an off-state and the processing is performed.

Since the ST header field of the following packet to be transmitted is same as the ST header field sent by M-SEARCH, it is possible to determine which M-SEARCH the response corresponds to. Moreover, information required to operate the device is described in a Location header field. (Here, such as URL of an XML file.) URL as a POST destination of XML is described in the XML file indicated by the aforementioned Location header field. Hereinbelow, an example will be illustrated.

```
<URLBase>http://192.168.0.1:80</URLBase>
...
<service>
...
<serviceType>urn:schemas-upnp-org:service:PlayCD:1</se
```

-continued

```
rviceType>
    <serviceId>urn:upnp-org:serviceId:PlayCD</serviceId>
    <SCPDURL>/upnp/service/PlayCD.xml</SCPDURL>
    <controlURL>/upnp/service/PlayCD</controlURL>
    <eventSubURL>/upnp/service/PlayCD</eventSubURL>
    </service>
...
```

According to this, it can be seen that a control URL which operates the PlayCD service is http://192.168.0.1:80/upnp/service/PlayCD.

The bottom-left column in FIG. 6 illustrates a specific example of the control request packet. According to this, the device B (remote control) transmits Play as a command to control the device A (CD player). More specifically, the XML information is posted to the device A describing the control content in the controlURL of PlayCD, as an action of the PlayCD service to play a CD of the CD player.

The bottom right column in FIG. 6 illustrates a specific example of the control response packet. When the packet to control the device A (CDplayer) is transmitted from the device B (remote control), the device A determines that it can not be processed by only the network processing unit. In that time, the automatic responding section 703 confirms whether or not the main processing unit 110 has started and, when the main processing unit 110 has not started, starts the main processing unit 110. The main processing unit 110 then obtains the control content, performs the processing, and transmits the control response packet as shown in the bottom right column in FIG. 6, as the response packet to the device B. This packet is transmitted as a normal packet as a response to a POST request.

The left column in FIG. 7 is the status acquisition request packet which inquires whether the status of the main processing unit 110 is changed while the device A performing the control request as shown in FIG. 6. Meanwhile, the right column in FIG. 7 illustrates a specific example of the status acquisition response packet which is the response to the status acquisition request packet. Since the main processing unit 110 performs the control request, the main processing unit 110 responds.

Figure 8:
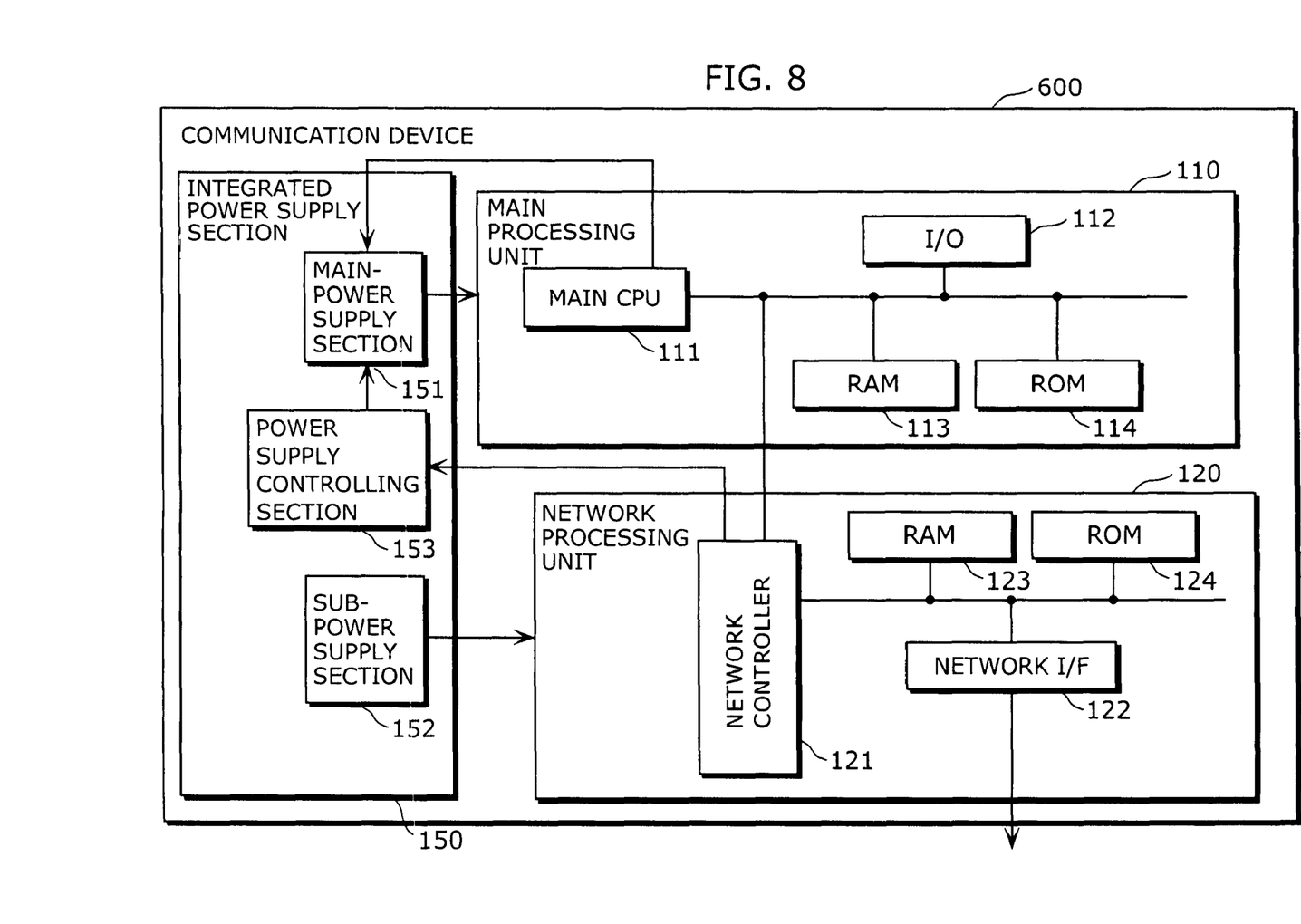
FIG. 8 is a diagram illustrating the communication device where a main-power supply section and a sub-power supply section are integrally formed.

It should be noted that, while the power supply section is divided into the main-power supply section 130 and the sub-power supply section 140 in this embodiment, it is also possible to use an integrated power supply section 150 as one power supply section, without dividing it into the main-power supply section 130 and sub-power supply section 140, as shown in FIG. 8.

When using one integrated power supply section 150, only a section required for the network processing is energized using part of the power supply section (sub-power supply section 152) and, upon the communication device itself being controlled, the remaining power supply section (main-power supply section 151) which has been in an off-state is started to perform the response to control of the controlling communication device. As described above, by integrating the power supply sections, a reduction in size in applying a one-chip configuration can be achieved, and an effect that the loss of the power in the power supply section can be reduced is provided. Additionally, it has the effect that the cost on hardware can be reduced compared to the case with two power supply sections. Note herein that, with the configuration in FIG. 8, the integrated power supply section 150 is provided with a power supply controlling section 153 therein instead of the power supply controlling section 704 provided in the network processing unit 120 in FIG. 3. However, the power supply controlling section 153 starts the main-power supply section 151 in accordance with the direction by the automatic responding section 703 and the address storage section 702 of the network processing unit 120, in a similar manner to that of the power supply controlling section 704 shown in FIG. 2.

As described above, the communication device of the present invention enables, without the external controlling communication device being conscious of the status of the communication device to be controlled and without turning on the power supply of the communication device on the network upon such as connecting a new communication device, to discover the communication device to be discovered and to announce to notify the presence/absence of the communication device, and to automatically turn on the power supply of the communication device upon controlling the communication device by determination of the communication device to be controlled itself.

Incidentally, the respective functional blocks in the block diagrams (e.g., FIGS. 2 and 3) are typically achieved as an LSI device which is an integrated circuit. They may be configured as one chip individually or may be integrated into one chip including a part or all of them.

For example, the functional blocks other than a memory may be integrated into one chip. It may also be configured as the LSI device including such as the CPU.

While it is referred to as the LSI device here, it may also be referred to as an IC, a system LSI, a super LSI, or an ultra LSI, depending on the difference in a degree of integration.

Moreover, the technique of integration may not be restricted to the LSI, and the integration may be achieved by a designated circuit or a general-purpose processor. After manufacturing the LSI, an FPGA (Field Programmable Gate Array) which is programmable or a reconfigurable processor which is reconfigurable of connection or setup of a circuit cell in the LSI may be utilized.

Furthermore, if the technique of integration replacing the LSI appears due to the development in semiconductor technology or other technologies derived therefrom, these technologies may be obviously utilized to integrate the functional blocks. Adaptation of biotechnology may be possible.

In addition, only the main processing unit 110 among the respective functional blocks may be provided as a separate configuration without being integrated into one chip. Moreover, only the main CPU 111 may be provided as a separate configuration.

According to the present invention, the communication device can be discovered without turning on the power supply of the communication device on the network upon such as connecting a new communication device, and, by the power supply of the communication device being automatically turned on upon controlling the communication device by determination of the communication device itself, the reduction in the power consumption can be achieved without causing any loss to the convenience of cooperation of the communication devices through communication while the controlling communication device does not constantly realize the status of the communication device.

The communication device of the present invention is useful for an operable electrical household appliance connected to the home network, such as a television, a DVD (Digital Versatile Disc) player, a CD player, an STB (Set Top Box), an HDD recorder, a DVD recorder, a printer, or a camera.

The invention claimed is:

1. A communication device for communicating via a network to provide a service to another communication device on the network, the communication device comprising:
a main processing unit operable to process a main service to be provided to the other communication device;
a communication processing unit operable to transmit and receive request information and response information corresponding to the request information with the other communication device via the network; and
a power supply unit operable to stop supplying power to said main processing unit while in a state of being able to supply the power again and operable to supply the power to said communication processing unit,
wherein said communication processing unit comprises:
a memory operable to store information required to create an alive packet which is transmitted periodically at a predetermined time and which indicates that the communication device is in a state of being able to provide the service, the required information including address information of the communication device, identification information of the communication device, and service information for the service provided by said main processing unit;
an alive packet transmitting unit operable to (i) read out, from said memory, at least the address information of the communication device and the service information, (ii) create the alive packet including the read out address information and service information, and (iii) transmit the created alive packet;
a response possibility determining unit operable to determine whether or not said communication processing unit is individually able to respond to the request information received from the other communication device which has received the alive packet;
a response unit operable to create the response information and to transmit the response information to the other communication device, when the determination indicates that the response is possible;
a power supply controlling unit operable to start said main processing unit, to control said power supply unit, and to supply the power to said main processing unit, when the determination indicates that the response is not possible; and
an address management unit operable to store information indicating an address of the communication device and a term of validity of the address, and, when a period until expiration of the term of validity reaches a predetermined time, to start said main processing unit via said power supply controlling unit to supply the power to said main processing unit, and to cause said main processing unit to execute an update processing of the address,
wherein said alive packet transmitting unit creates and transmits the alive packet while said main processing unit is in a condition of not yet having power to provide a main service.

2. The communication device according to claim 1, wherein said response unit is operable to transmit the received request information to said main processing unit when the determination indicates that the response is not possible, and
said main processing unit is operable to perform the processing of responding to the request information that has been transmitted.

3. The communication device according to claim 2, wherein, when said main processing unit completes the processing of responding to the request information that has been transmitted, said main processing unit is operable to control said power supply unit to stop supplying the power to said main processing unit.

4. The communication device according to claim 1, wherein said response possibility determining unit is operable to determine that the response is not possible when the received request information is:
(1) a control request which requires control for another communication device to receive the service provided by said communication device; or
(2) a status inquiry request which inquires about a status of a service of said communication device.

5. The communication device according to claim 1, wherein said power supply controlling unit is operable to control said power supply unit to stop supplying the power to said main processing unit when the request information determined not to be possible to respond is not received for a predetermined period.

6. The communication device according to claim 1, wherein said power supply unit is configured as one power supply unit including a main-power supply unit operable to supply the power to said main processing unit and a communication power supply unit operable to supply the power to said communication processing unit, and said power supply control unit is operable to control the power supply to said main processing unit in accordance with a direction from said communication processing unit or said main processing unit.

7. The communication device according to claim 1, wherein said power supply unit includes:
a main-power supply unit operable to supply the power to the main processing unit; and
a communication power supply unit operable to supply the power to said communication processing unit,
wherein said power supply controlling unit is operable to control the power supply to said main processing unit by controlling said main-power supply unit in accordance with a direction from said communication processing unit or said main processing unit.

8. The communication device according to claim 1, wherein said response possibility determining unit is operable to determine the possibility of response by said communication processing unit based on a port number or URL included in the received request information.

9. The communication device according to claim 1, wherein said response possibility determining unit is operable to determine that the response is possible when the received request information is:
(1) a discovery request inquiring with the other communication device whether the communication device is present,
(2) an acquisition request of description information, indicating at least one of a type, a name, an ID, and the provided service of the communication device; or
(3) both (1) and (2).

10. The communication device according to claim 1, wherein
the address management unit is operable to store information indicating an address of the communication device and a term of validity of the address, and, when the period until expiration of the term of validity has reached a predetermined time, to perform update processing of the address.

11. A communication method for a communication device of communicating via a network to provide a service to another communication device on the network, the communication method comprising:

a main processing step of processing a main service provided to the other communication device;
a communication processing step of transmitting and receiving request information and response information corresponding to the request information with the other communication device via the network; and
a power supply step of stopping supplying power for performing said main processing step while in a state of being able to supply the power again, and supplying the power for performing said communication processing step,
wherein said communication processing step includes:
storing, in a memory, information required to create an alive packet which is transmitted periodically at a predetermined time and which indicates that the communication device is in a state of being able to provide the service, the required information including address information of the communication device, identification information of the communication device, and service information for the service provided by said main processing step;
reading out, from the memory, at least the address information of the communication device and the service information, creating the alive packet including the read out address information and service information, and transmitting the created alive packet;
a response possibility determination step of determining whether or not it is possible, in said communication processing step, to respond to the request information received from the other communication device which has received the alive packet;
a response step of creating the response information and transmitting to the other communication device, when the determination indicates that the response is possible;
a power supply control step of starting said main processing step, controlling said power supply step, and supplying the power to said main processing step, when the determination indicates that the response is not possible; and
an address management step of storing information indicating an address of the communication device and a term of validity of the address, and, when a period until expiration of the term of validity reaches a predetermined time, starting said main processing step via said power supply control step to supply the power to said main processing step, and causing said main processing step to execute an update processing of the address,
wherein said communication processing step of creating and transmitting the alive packet is performed while said main processing step is in a condition of not yet having power to provide a main service.

12. A semiconductor device into which a communication device is integrated as a chip, the communication device being for communicating via a network to provide a service for other communication devices on the network, the semiconductor device comprising:
a main processing unit operable to process a main service provided to the other communication device;
a communication processing unit operable to transmit and receive request information and response information corresponding to the response information with the other communication device via the network; and
a power supply unit operable to stop supplying power to said main processing unit while in a state of being able to supply the power again, and operable to supply the power to said communication processing unit, wherein said communication processing unit includes:

a memory operable to store information required to create an alive packet which is transmitted periodically at a predetermined time and which indicates that the communication device is in a state of being able to provide the service, the required information including address information of the communication device, identification information of the communication device, and service information for the service provided by said main processing unit;

an alive packet transmitting unit operable to (i) read out, from said memory, at least the address information of the communication device and the service information, (ii) create the alive packet including the read out address information and service information, and (iii) transmit the created alive packet;

a response possibility determining unit operable to determine whether or not said communication processing unit is individually able to respond to the request information received from the other communication device which has received the alive packet;

a response unit operable to create the response information and transmit to the other communication device, when the determination indicates that the response is possible;

a power supply controlling unit operable to start said main processing unit, control said power supply unit, and supply the power to said main processing unit, when the determination indicates that the response is not possible; and an address management unit operable to store information indicating an address of the communication device and a term of validity of the address, and, when a period until expiration of the term of validity reaches a predetermined time, to start said main processing unit via said power supply controlling unit to supply the power to said main processing unit, and to cause said main processing unit to execute an update processing of the address, wherein said alive packet transmitting unit creates and transmits the alive packet while said main processing unit is in a condition of not yet having power to provide a main service.

13. A communication device for communicating via a network to provide a service to another communication device on the network, the communication device comprising:

a main processing unit operable to process a main service to be provided to the other communication device;

a communication processing unit operable to transmit and receive request information and response information corresponding to the request information with the other communication device via the network; and a power supply unit operable to stop supplying power to said main processing unit while in a state of being able to supply the power again and operable to supply the power to said communication processing unit, wherein said communication processing unit comprises:

a memory operable to store information required to create an alive packet which is transmitted periodically at a predetermined time and which indicates that the communication device is in a state of being able to provide the service, the required information including address information of the communication device, identification information of the communication device, and service information for the service provided by said main processing unit;

an alive packet transmitting unit operable to (i) read out, from said memory, at least the address information of the communication device and the service information, (ii) create the alive packet including the read out address information and service information, and (iii) transmit the created alive packet;

a response possibility determining unit operable to determine whether or not said communication processing unit is individually able to respond to the request information received from the other communication device which has received the alive packet;

a response unit operable to create the response information and to transmit the response information to the other communication device, when the determination indicates that the response is possible;

a power supply controlling unit operable to start said main processing unit, to control said power supply unit, and to supply the power to said main processing unit, when the determination indicates that the response is not possible; and an address management unit operable to store information indicating an address of the communication device and a term of validity of the address, and, when the period until expiration of the term of validity has reached a predetermined time, to perform update processing of the address, wherein said alive packet transmitting unit creates and transmits the alive packet while said main processing unit is in a condition of not yet having power to provide a main service.

* * * * *